US010003257B2

(12) United States Patent
Barker et al.

(10) Patent No.: US 10,003,257 B2
(45) Date of Patent: Jun. 19, 2018

(54) CONVERTER

(71) Applicant: ALSTOM TECHNOLOGY LTD, Baden (CH)

(72) Inventors: Carl Barker, Staffordshire (GB); Jose Maneiro, Horgues (FR)

(73) Assignee: ALSTOM TECHNOLOGY LTD (CH)

(*) Notice: Subject to any disclaimer, the term of this patent is extended or adjusted under 35 U.S.C. 154(b) by 0 days. days.

(21) Appl. No.: 15/116,725

(22) PCT Filed: Feb. 6, 2015

(86) PCT No.: PCT/EP2015/052528
§ 371 (c)(1),
(2) Date: Aug. 4, 2016

(87) PCT Pub. No.: WO2015/118114
PCT Pub. Date: Aug. 13, 2015

(65) Prior Publication Data
US 2016/0344286 A1 Nov. 24, 2016

(30) Foreign Application Priority Data
Feb. 7, 2014 (EP) ..................................... 14154345

(51) Int. Cl.
*H02M 3/07* (2006.01)
(52) U.S. Cl.
CPC ........ *H02M 3/07* (2013.01); *H02M 2003/072* (2013.01)

(58) Field of Classification Search
CPC .......... H02M 3/06; H02M 3/07; H02M 3/158; H02M 2003/06; H02M 2003/07; H02M 2003/158
See application file for complete search history.

(56) References Cited

U.S. PATENT DOCUMENTS

| 6,198,645 | B1 | 3/2001 | Kotowski et al. |
| 6,657,875 | B1 | 12/2003 | Zeng et al. |
| 7,190,210 | B2* | 3/2007 | Azrai ...................... H02M 3/07 257/298 |

(Continued)

FOREIGN PATENT DOCUMENTS

WO 2009136368 11/2009

OTHER PUBLICATIONS

International Search Report in corresponding application No. PCT/EP2015/052528 dated Oct. 6, 2015.

*Primary Examiner* — Matthew Nguyen
(74) *Attorney, Agent, or Firm* — Parks IP Law LLC

(57) ABSTRACT

A DC to DC converter for converting voltage between two voltage levels is described. The converter comprises a plurality of capacitors and switch units and is controllable between a first and second commutation state. In the first commutation state, the converter is configured for connection to higher voltage terminals and the capacitors are connected in series. In the second commutation state, the converter is configured for connection to lower voltage terminals, and the capacitors are connected to form at least two branches connected in parallel, the branches comprising a series connection of at least two capacitors. In some embodiments, one or more intermediate commutation states may also be provided.

25 Claims, 15 Drawing Sheets

(56) References Cited

U.S. PATENT DOCUMENTS

| | | | |
|---|---|---|---|
| 7,907,429 B2* | 3/2011 | Ramadass | H02M 3/07 307/110 |
| 8,817,501 B1* | 8/2014 | Low | H02M 3/07 363/59 |
| 2009/0091302 A1 | 4/2009 | Rusan | |
| 2009/0219078 A1 | 9/2009 | Chu | |
| 2010/0080023 A1* | 4/2010 | Jain | H02M 3/07 363/65 |
| 2010/0117612 A1* | 5/2010 | Klootwijk | H01L 27/0805 323/282 |
| 2011/0175591 A1 | 7/2011 | Cuk | |
| 2012/0169406 A1* | 7/2012 | Liu | H02M 3/07 327/536 |
| 2013/0147543 A1 | 6/2013 | Dai et al. | |

* cited by examiner

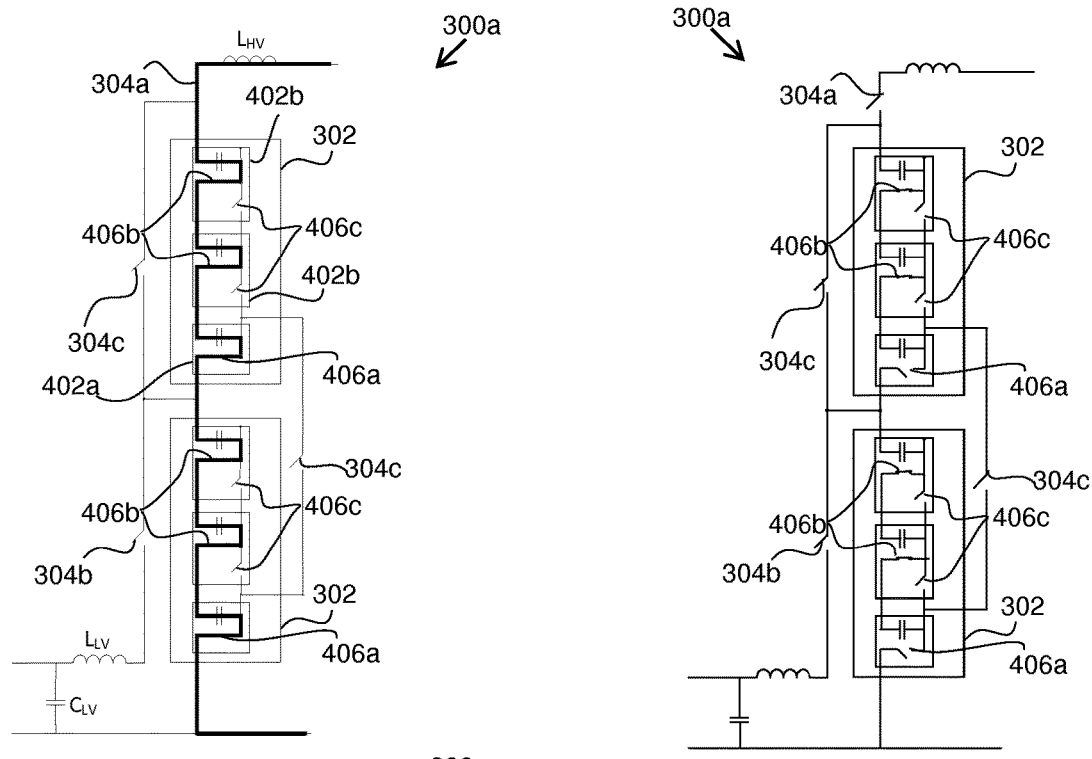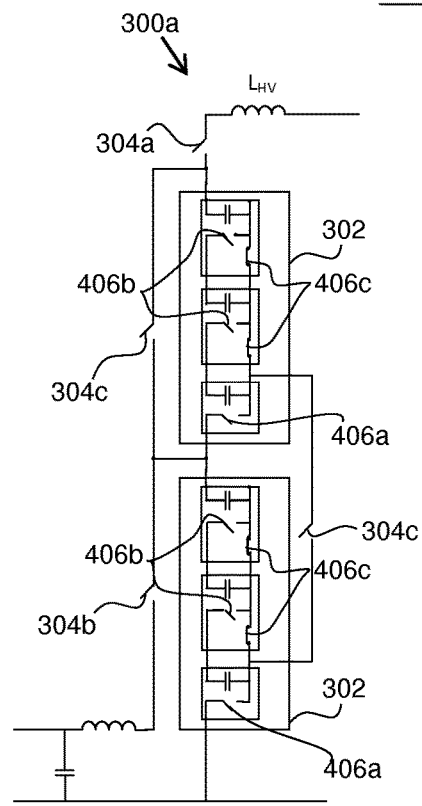
Fig.6A
Fig.6B
Fig.6C

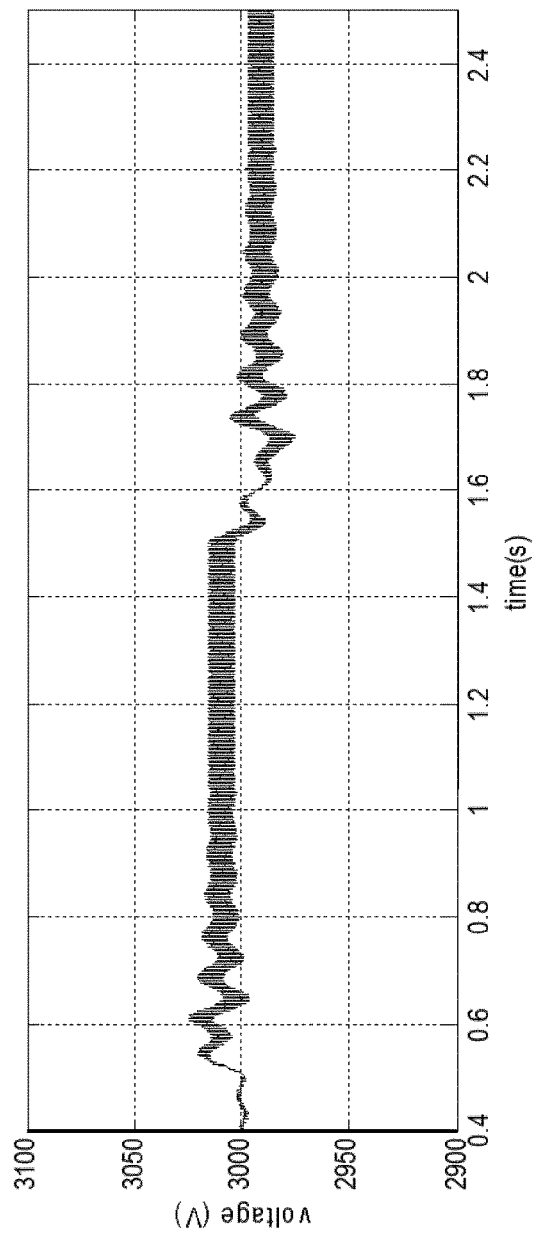
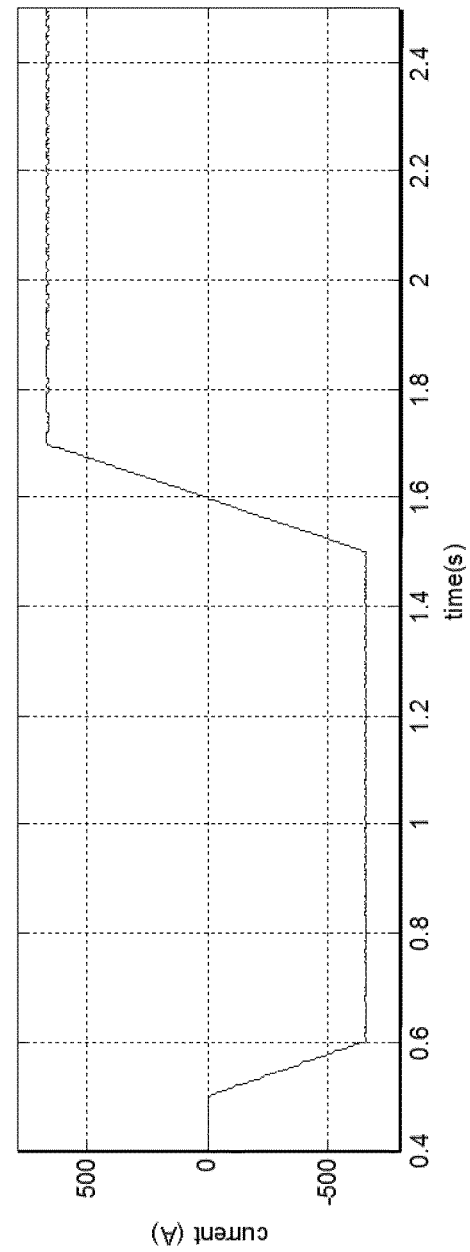
Fig.9B
Fig.9C

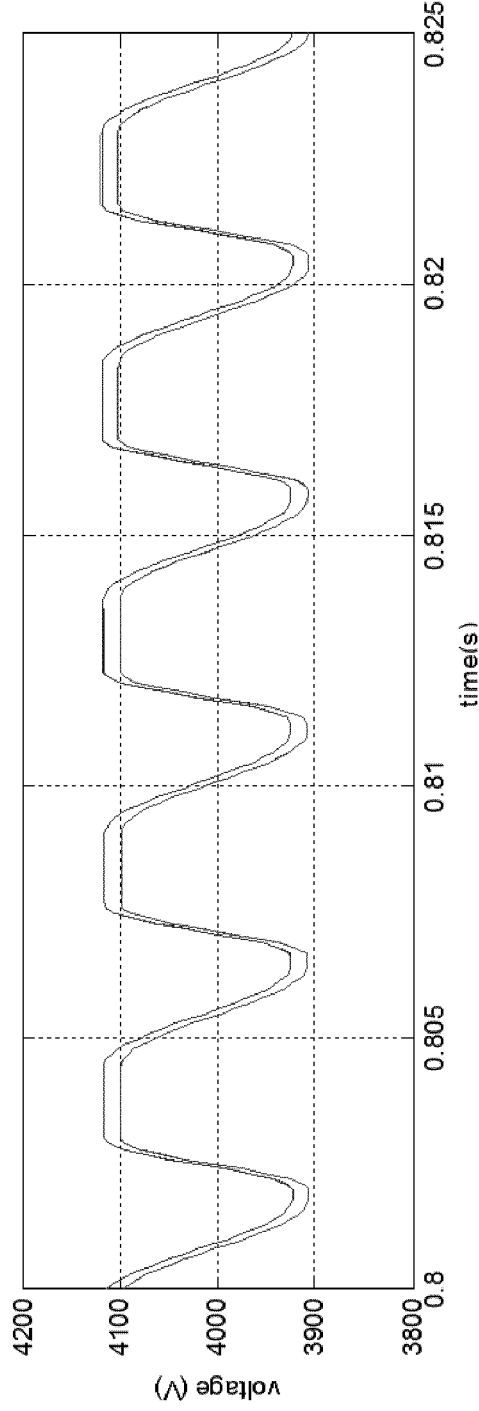
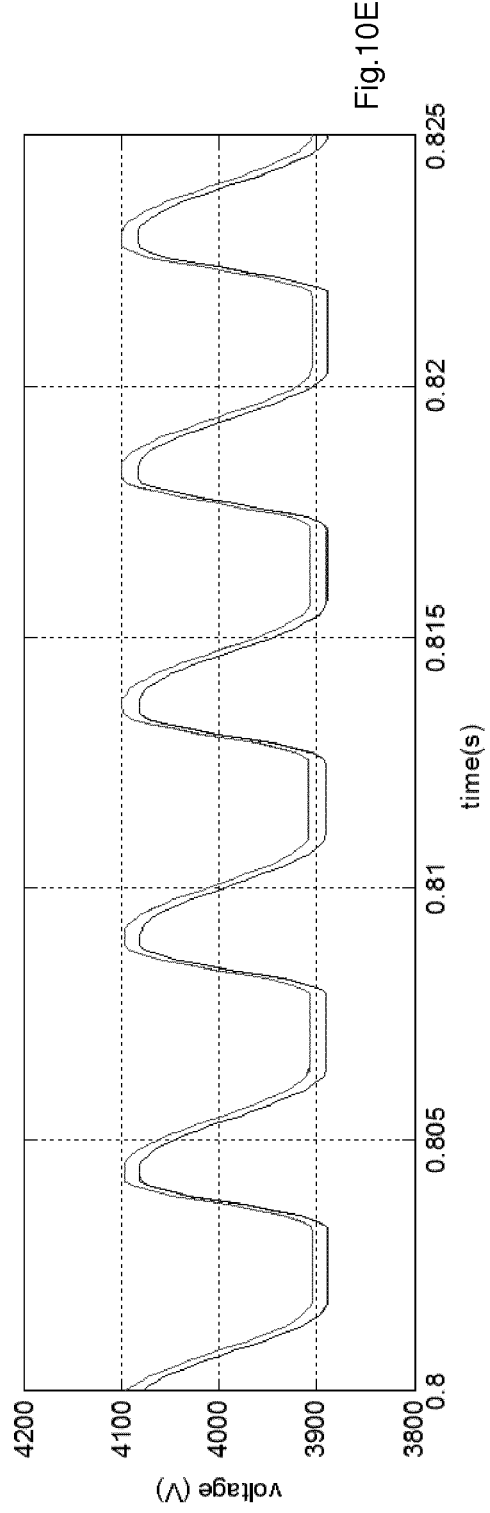

CONVERTER

This invention relates to Direct Current to Direct Current (DC-DC) converters, in particular but not exclusively for use in medium or high voltage grids.

There is often a desire to change the voltage level of a power source. Such a desire is seen in all manner of electronic devices, from low power devices (for example, a battery in a computer may supply a particular voltage, but circuits therein may individually require a different voltage) to High Voltage Direct Current (HVDC) networks. For example, in the developing field of HVDC power transmission, it may be desirable to interconnect a DC transmission network and a DC distribution network. However, these networks may operate at different voltage levels.

In higher power applications, DC to DC convertors usually comprise two conversion stages, transforming the current from DC to Alternating Current (AC) then back to DC. This intermediate AC stage may require use of a transformer. Such converters are heavy and bulky, with a high number of components.

Direct DC to DC converters are also known. These include so called "DC chopper" circuits, where an arrangement normally involving passive energy storage components (such as inductors and capacitors), and semiconductors (diodes and controlled switches such as bipolar junction transistors (BJTs), metal-oxide-semiconductor field-effect transistors (MOSFETs) or insulated-gate bipolar transistor (IGBTs)) is used, as shown in FIGS. 1A and 1B respectively, which illustrate a step down (Buck) and step up (Boost) converter respectively.

Referring to the devices shown in FIGS. 1A and 1B, switch S is commutated with the desired frequency and duty cycle in order to achieve a transfer of energy from a voltage source $V_{in}$ to an inductor L and a capacitor C while regulating the output voltage level $V_{out}$. Diode D is a unidirectional current device.

Such switched topologies require high switching frequencies in order to reduce the size of the passive components. Further, they require switch S to withstand the full DC voltage. As the voltage rating of such switches is usually limited, for higher voltage operation a single switch could be replaced by a series connection of switches, or an alternative arrangement with half or full bridge cells could be used. Were such a circuit to be used in a medium or high voltage DC environment, however, the power losses in the semiconductor devices would reach unacceptable levels.

The skilled person will also be aware of a "Marx Generator", a circuit used to generate high-voltage impulses. Such a circuit usually comprises a set of capacitors and electro-mechanical or solid-state switches, arranged to form a repeating structure. A general configuration for this circuit using semiconductor switches is shown in FIGS. 2A-C, in which capacitors are designated as C, diodes as D, and switches as S.

Two commutation states are defined, and applied to the circuit sequentially and cyclically. The first commutation state connects the capacitors $C_n$ in parallel across the low voltage source $V_{dc}$ (FIG. 2B) allowing for an energy transfer between the capacitors C and the source $V_{dc}$. The second commutation state connects the capacitors in series across the high voltage terminal ($V_o$) of the circuit (FIG. 2C).

RU2454779 and RU2394344 disclose a circuit comprising a connection of capacitors and proposed for the implementation of DC to DC converters in railway trains. The circuit uses a combination of solid-state switches and capacitors to transfer energy from a low voltage source to a high voltage source. The circuit comprises two arms, with a high voltage source connected across both arms, and a low voltage source connected across the middle point of both arms. The circuit can be arranged as the Marx generator in the commutation states described above (FIGS. 2B and 2C), with all the top and bottom arm capacitors connected in parallel first across the low voltage source and then in series across the high voltage source, which leads to the same equivalent circuit commutation states as those shown in FIG. 2. Alternatively, in order to reduce the voltage stress withstood by switches therein, both arms can be separately connected in parallel across the low voltage source and then together in series across the high voltage source. The voltage level in each capacitor must equal the voltage level of the low voltage source in both modes of operation. This limits the circuit low voltage output to the maximum voltage that each capacitor can be charged to, which in turn is limited by the maximum voltage rating of the solid-state switches employed in the circuit.

Related ideas are all discussed in N. N. Lopatkin, G. S. Zinoviev, and L. G. Zotov, "Bi-directional high-voltage DC-DC converter for advanced railway locomotives," *Energy Conversion Congress and Exposition (ECCE)*, 2010 IEEE, 2010, pp. 1123-1128

According to a first aspect of the invention, there is provided a DC to DC converter for converting voltage between a higher voltage and a lower voltage, the converter comprising a plurality of capacitors and switch units and being controllable between a first and second commutation state by operation of at least one switch unit, wherein, in the first commutation state, the converter is configured for connection to higher voltage terminals and the capacitors are connected in series, and in the second commutation state, the converter is configured for connection to lower voltage terminals, and the capacitors are connected to form at least two branches connected in parallel, the branches comprising a series connection of at least two capacitors.

The converter is therefore controllable between a 'series' configuration and what could be termed a 'matrix' configuration, in which parallel branches of series connected capacitors are provided. The provision of at least two capacitors connected in series when configured for connection to the lower voltage terminals means that the lower voltage connection may be sum of the maximum voltage for the series connected capacitors. This therefore provides a flexible topology for a converter, where the voltage of the lower voltage network is not limited to the voltage rating of a single capacitor, and instead the number of series connected capacitors may be selected as appropriate.

Within this context, the terms 'higher voltage' and 'lower voltage' are used in the comparative sense as will be familiar to the skilled person from discussion of converters in general: indeed such apparatus is generally described as simply having a high voltage side and a low voltage side. Therefore, the terms 'lower voltage' or 'low voltage' and 'higher voltage' or 'high voltage' in this sense (i.e. when specifically referring to the connection terminals or connecting networks either side of a converter) shall not be taken to imply any limitation on the actual voltage, which in some preferred embodiments may both be relatively high, for example in the few kilovolts to hundreds of kilovolts range.

Conveniently, each branch comprises the same number of capacitors, or at least the same capacitance.

In some embodiments, the capacitors may be arranged in clusters. Preferably, the clusters are arranged such that, in the first and in the second commutation states, the capacitors within a cluster are connected in series. A cluster may therefore provide a branch of the 'matrix'-like configuration of the second commutation state. Configuring the converter in terms of clusters simplifies the reconfiguration from a series to a parallel connection.

In some examples, a converter is made up of a limited number of types of cluster, for example 1, 2, 3 or 4 types of cluster. A plurality of clusters of the same type may be provided in a given converter. This eases manufacturing and design requirements, providing a converter with a readily scalable design, in which the number of clusters may be selected according the anticipated functional environment of a given converter.

In the first commutation state, the clusters may be connected in series and in the second commutation state, the clusters may be connected in parallel. The converter may comprise at least two clusters and at least two switch units arranged to allow selective connection of the clusters in series in the first commutation state and in parallel in the second commutation state.

In one embodiment, each capacitor is associated with at least one switch unit, for example in a functional cell. Such a design will be readily scalable. The converter may be made up of a limited number of types of cell, for example two, three or four types of cell. A plurality of cells of at least one such type may be provided in a given converter, which eases manufacturing requirements.

In preferred embodiments, the converter is controllable by operation of at least one switch unit to one or more intermediate commutation state(s) during transformation between the first and second commutation states. Such intermediate states may be arranged to utilise, effect and/or maintain a low, or even zero voltage condition for switching of at least some switch units within the converter. The intermediate commutation state(s) may comprise interrupting (for example by opening a switch) at least one series connection between the capacitors, for example those within a branch of the converter when the converter is in the second commutation state. Therefore, at least one switch unit may be provided to selectively connect capacitors in series or to interrupt the series connection. In one example, at least one switch unit is provided between each capacitor in a branch for this purpose. Alternatively or additionally, the intermediate commutation state(s) may be arranged to configure the capacitors to clamp the voltage across one or more switch units. For example, the voltage may be clamped across one or more switch units to be at most the voltage across a single capacitor.

This may be advantageous, for example, to limit the voltage across components during switching. Even if disconnected from both networks, if the capacitors remain in series connection, a voltage may be seen across circuit components such as switches. However, providing at least one intermediate commutation state in which the number of series connected capacitors is reduced (or in some examples, most or all series connections are removed) limits the voltage across circuit components during switching from the first commutation state to the second commutation state and therefore allows switching to occur at low or zero voltages, resulting in lower losses and lower rating requirements for the switch units (which is usually associated with a reduction in cost).

The converter may further be arranged to switch from the first commutation state to the second commutation state in a condition of zero, or near zero, current flow from a connected network (which state may be seen due to a resonant nature of the circuit). In such examples, the circuit may comprise one or more inductors. In some examples, the converter may be provided with a means (for example resistors connected in parallel with each capacitor) to assist in balancing series connected capacitors. Such an arrangement will be familiar to the person skilled in the art.

The converter may be arranged such that the maximum voltage across any switch unit within a cell (and/or, in some examples, at least one switch unit outside a cell) during transformation between the first and second commutation states is at most the voltage across one cell capacitor.

In some examples, the converter may be a bi-pole converter and comprise two arms, each arm comprising a plurality of capacitors and switch units and being controllable, by operation of at least one switch unit, between a first and second commutation state wherein,
  in the first commutation state, the converter is configured for connection to higher voltage terminals and the capacitors are connected in series, and
  in the second commutation state, the converter is configured for connection to lower voltage terminals, and the capacitors in each arm are connected to form at least two parallel branches, the branches comprising a series connection of at least two capacitors, wherein a lower voltage terminal is connected to a point between the arms.

In some such embodiments, the lower voltage terminal between the arms may be at ground potential, which allows for a more relaxed voltage isolation ratings for any equipment connected to it.

In such embodiments, one or more switch unit may be provided in at least one arm to allow selective connection of the at least one arm to both positive and negative lower voltage terminal.

The switch units may comprise one or more of: a single switch; a series of connected switches; a parallel connection of switches; a combination of series and parallel connected switches; at least one uni-directional switch associated with an anti-parallel uni-directional current device (such as a diode); a series connection of uni-directional switches, wherein the series connection is associated with at least one anti-parallel uni-directional current device; or the like. In preferred embodiments, at least one switch unit comprises one or more semiconductor devices, for example a bipolar junction transistor (BJT), metal-oxide-semiconductor field-effect transistors (MOSFET) or insulated-gate bipolar transistor (IGBT).

The converter is preferably bi-directional, in the sense that it may either transfer power from the higher voltage terminals to the lower voltage terminals or vice versa. This provides a versatile converter, which may be able to react to conditions of associated networks or network buses, or be suitable for installation where bi-directional power flow is required.

According to a second aspect of the present invention, there is provided a method of converting voltage between a higher voltage and a lower voltage, the method comprising (i) providing a plurality of capacitors in a series configuration connected to higher voltage terminals; (ii) disconnecting the capacitors from the higher voltage terminals; (iii) reconfiguring the connections therebetween into a matrix configuration comprising at least two parallel branches, the branches comprising a series connection of at least two capacitors; and (iv) connecting the matrix configuration to lower voltage terminals.

In some examples, the method further comprises the steps of (v) disconnecting the capacitors from the lower voltage terminals; (vi) reconfiguring the connections therebetween into a series configuration, and (vii) connecting the series configuration to the higher voltage terminals.

The steps may be carried out in sequence, or at least two steps may be carried out in overlapping time frames or substantially simultaneously.

The term 'matrix' configuration should not be taken to imply that a regular array of capacitors is provided (although this may be the case), but simply that the arrangement comprises at least two branches connected in parallel, and at least two such branches having series connected capacitors therein.

Preferably, the steps are carried out in a condition of low, near zero or zero current flow. In such examples, the circuit may conveniently be a resonant circuit. The step of providing a plurality of capacitors in a series configuration connected to higher voltage terminals (i.e. step (i)), or else a step of providing a plurality of capacitors in a matrix configuration comprising at least two parallel branches, the branches comprising a series connection of at least two capacitors connected to lower voltage terminals (i.e. the state of the converter after step (iv)) may continue until current flow within the circuit ceases, at which point steps (ii) to (iv) and/or (v) to (vii) are carried out.

As will be appreciated, steps (i) to (vii) may be carried out cyclically, such that a connection to the higher and lower voltage terminals is made alternately and repeatedly. The method may start at step (i) or with the provision of a plurality of capacitors in a matrix configuration comprising at least two parallel branches, each branch comprising a series connection of at least two capacitors connected to a lower voltage bus (i.e. the state of the converter after step (iv)).

The method may be a method of transferring power from the higher voltage terminals to the lower voltage terminals, or vice versa, or be capable of transferring power in both directions (i.e. the converter may be a step up, step down or bi-directional converter).

In some embodiments, the method further comprises reconfiguring the connections between the capacitors into at least one intermediate commutation state. Such an intermediate state may be arranged to maintain a low, or even a zero voltage condition across at least one switch unit during at least one of the steps of disconnecting from a network, reconfiguring the connections between capacitors and connecting to a network. In particular, the method may comprise reconfiguring the connections between the capacitors to remove at least one series connection therebetween.

The steps of disconnecting from network terminals, reconfiguring the connections between the capacitors and connecting to a network terminals may comprise controlling switch units. The switch units may comprise one or more semiconductor switches.

The method may comprise method of using the converter according to the first aspect of the invention. Teaching provided in relation to one aspect of the invention may be applied to the other aspect of the invention.

Embodiments of the invention will now be described by way of example only with reference to the following drawings, of which:

FIGS. 1A and 1B respectively show a prior art step down and step up converter;

FIG. 2A-C show a prior art configuration of a Marx Generator;

Figure 1A:
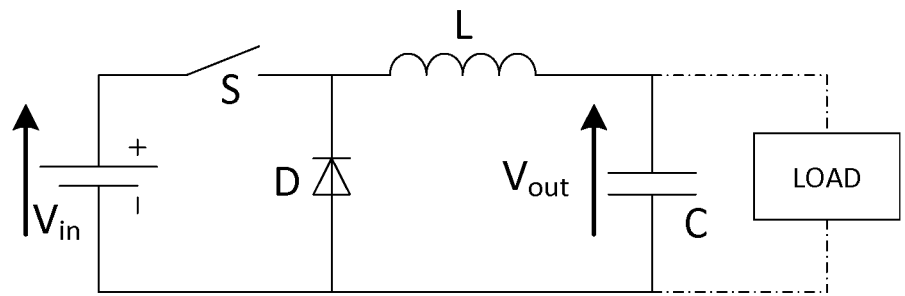
Figure 1B:
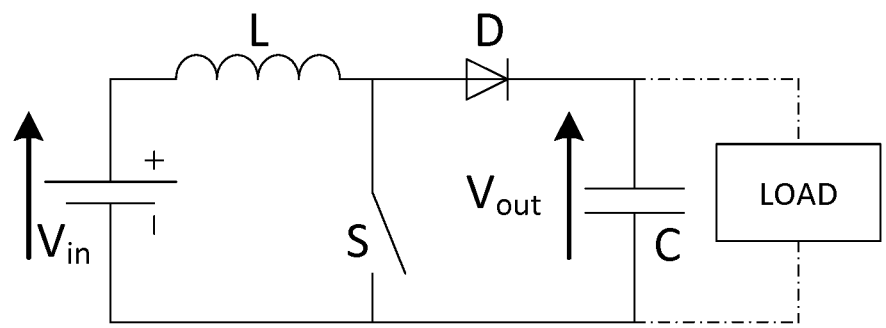
Figure 2A:
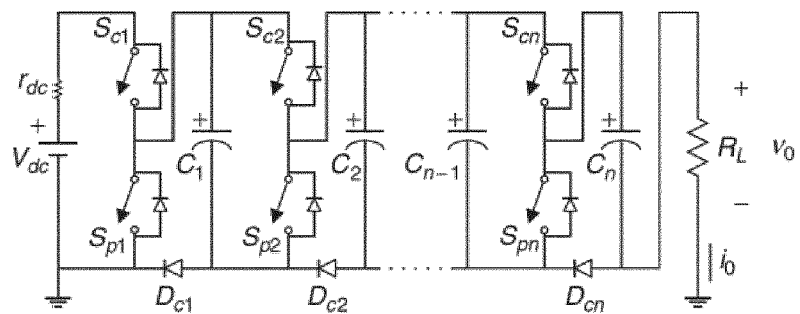
Figure 2B:
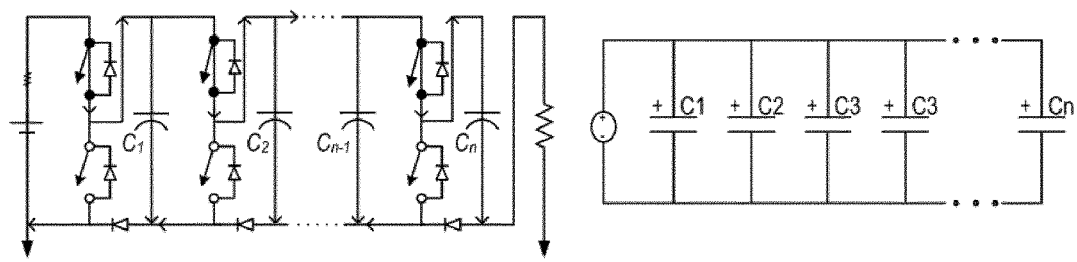
Figure 2C:
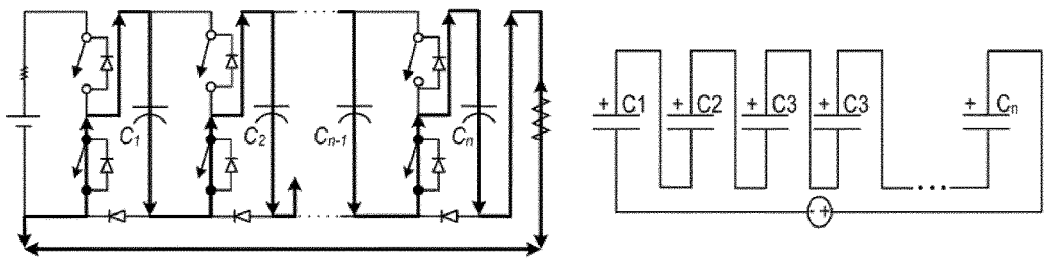
Figure 3:
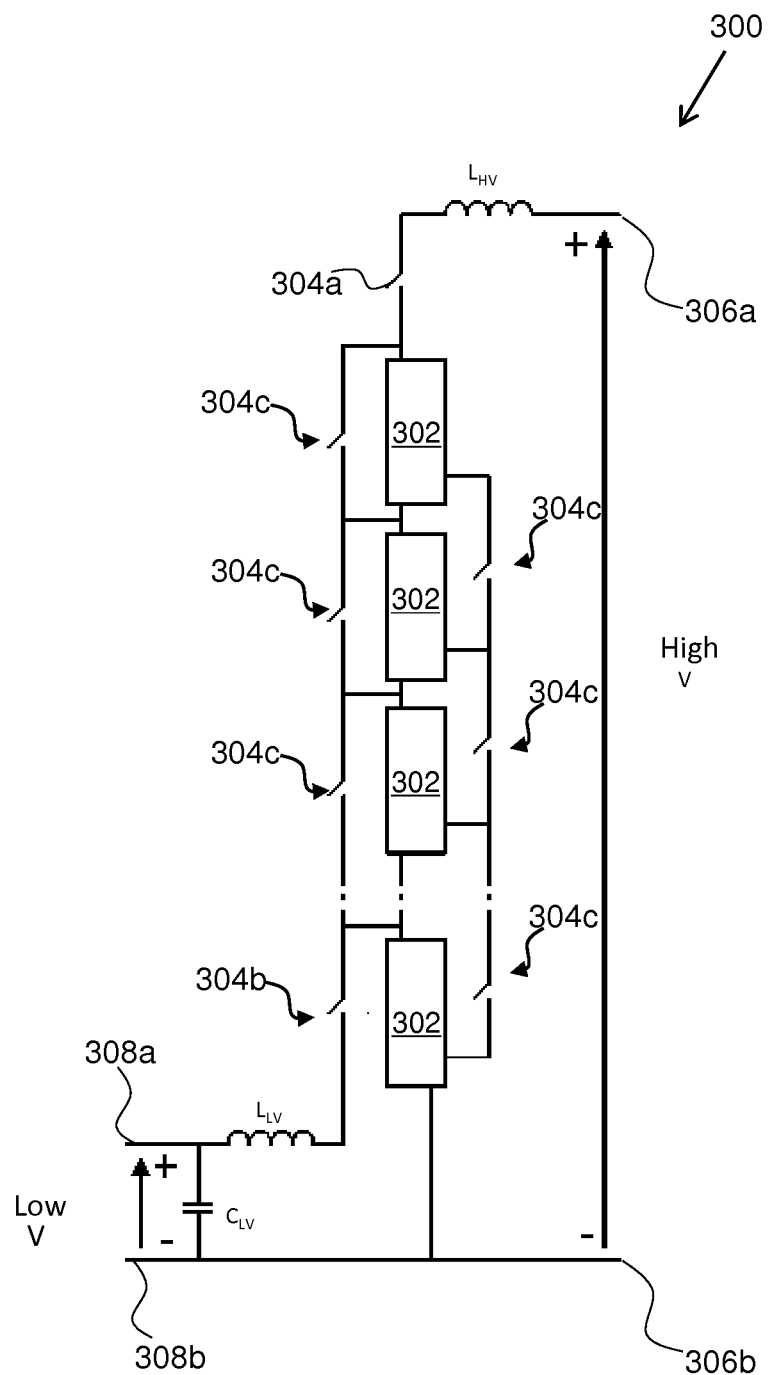
FIG. 3 shows a modular DC-DC converter according to one embodiment of the present invention.
Figure 5A:
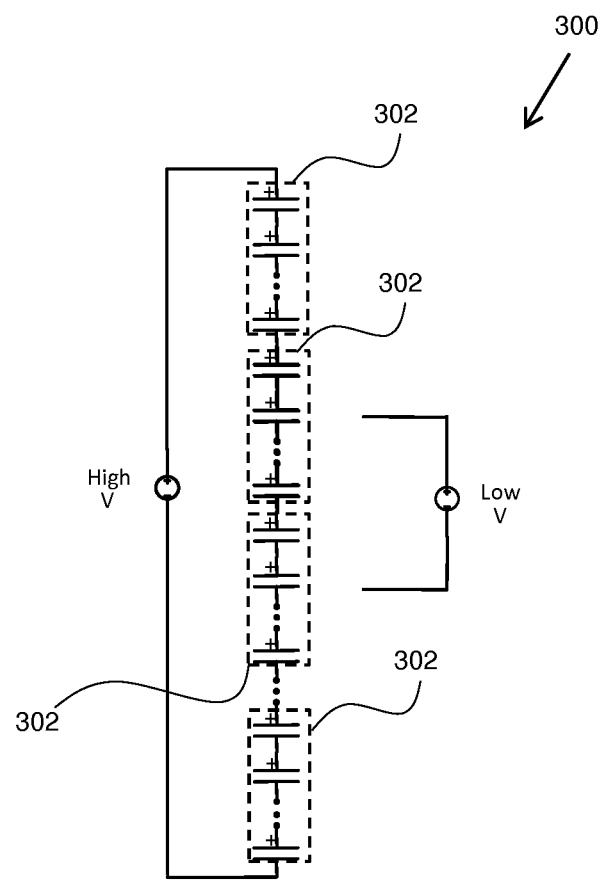
Figure 5B:
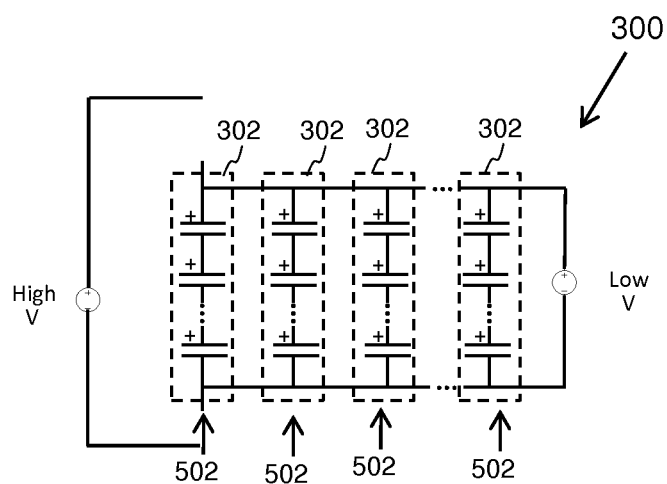
Figure 7:
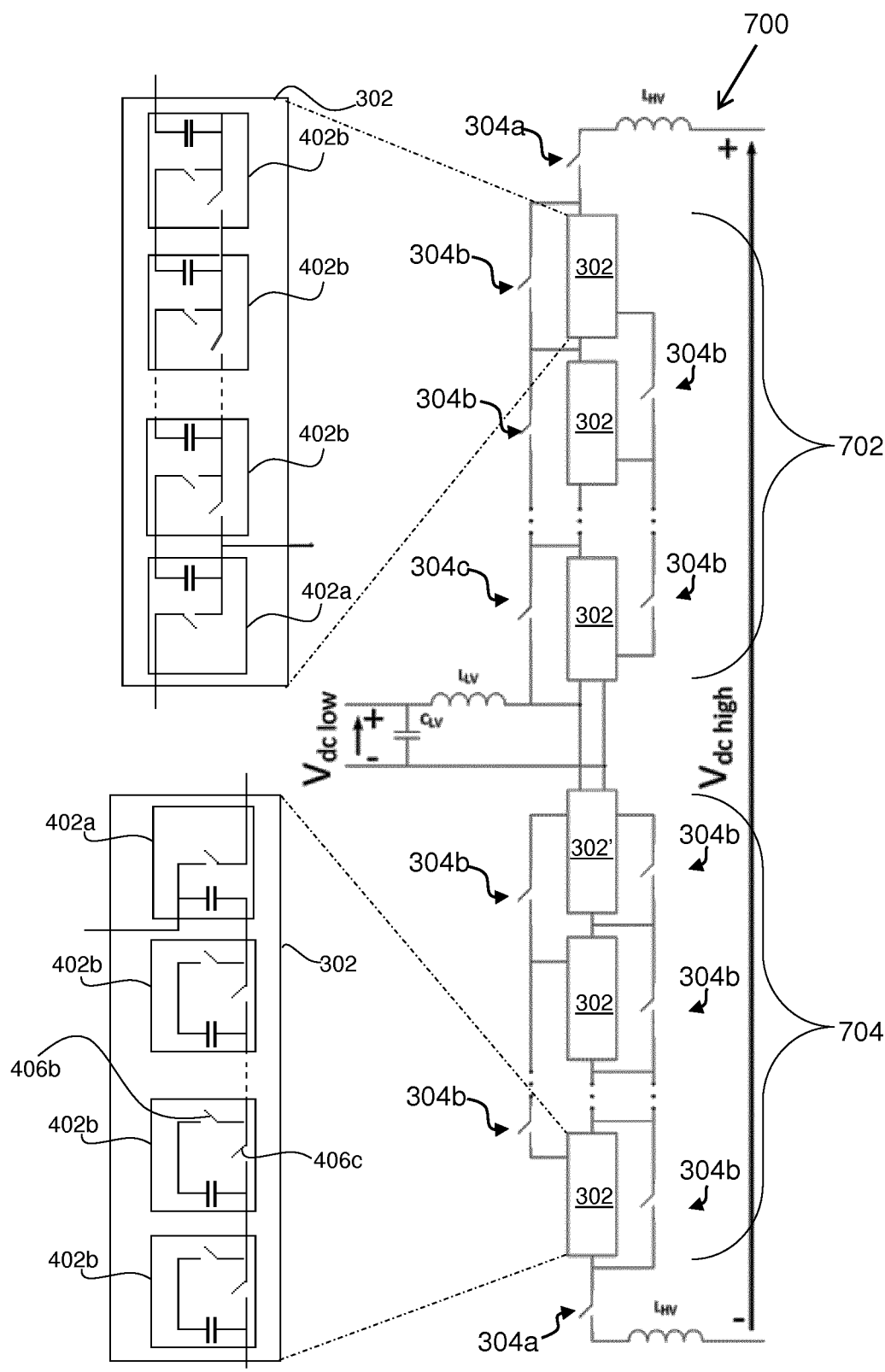
Figure 8:
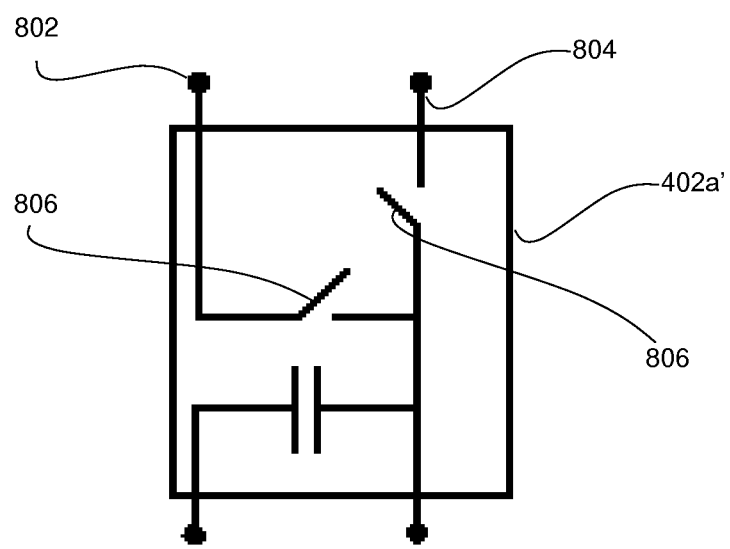

FIGS. 5A and 5B respectively show a representation of a first and second commutation state of the converter of FIG. 3;

FIGS. 6A to 6F respectively show a first, four intermediate and a second commutation state of the converter of FIG. 3;

FIG. 7 shows a bi-polar modular DC-DC converter according to one embodiment of the present invention;

FIG. 8 shows detail of a cell within the converter of FIG. 7;

FIGS. 9A-E show power, currents and voltage waveforms within a monopole converter during operation; and FIGS. 10A-G show power, currents and voltage waveforms within a bipole converter during operation.

FIG. 3 shows a converter 300 according to one embodiment of the invention for use between DC systems (for example, MVDC and HVDC systems) with a monopole configuration (i.e. having a grounded negative network pole). The converter 300 comprises a number of clusters 302 arranged between switch units, which in this example are switches 304a-c.

The clusters 302 may be selectively connected in series or in parallel, and with a higher voltage network or a lower voltage network, as described in greater detail below, by selective operation of the switches 304. In a general case, where N clusters 302 are provided, the converter 300 comprises 2N switches 304.

Two categories of switch 304 are provided. In particular, there are two network switches 304a and 304b, a higher voltage network switch 304a and lower voltage network switch 304b, allowing selective connection to the higher voltage or lower voltage terminals respectively. In addition, there are parallel connection switches 304c arranged such that, when the switches 304c are closed (i.e. such that current may pass therethrough), the clusters 302 may be arranged in parallel connection, each cluster 302 providing a branch of a matrix configuration of the converter 300.

Although as shown herein, the switches 304 are represented as simple switches, in some examples at least one switch 304 may be provided by a switch unit comprising a uni-directional switch associated with a uni-directional current device, such as a diode, such that the switch may be by-passed in its open state when the current flow is in a first direction but current will not flow in the opposite direction unless the switch 304 is closed. Alternatively or additionally several switches could be provided in a series and/or parallel connection and arranged to operate together to provide the function of a single switch, for example to increase the current rating of the converter 300 compared to that which could be used with a single switch of the same rating.

The converter 300 further comprises higher voltage ($V_{dc\ high}$) terminals 306a, 306b (shown on the right hand side of the Figure as drawn), and a higher voltage inductor $L_{HV}$, which creates a resonant circuit with capacitors internal to the clusters 302, as will be described below. Lower voltage terminals ($V_{dc\ low}$) 308a, 308b are arranged on the left hand side of the Figure as drawn, and associated with a lower voltage inductor $L_{LV}$ and a lower voltage capacitor $C_{LV}$ creating the another resonant circuit.

A portion of broken lines can be seen in FIG. 3, to illustrate that any number of clusters and parallel connection switches 304c may be provided as desired. Similar notation is used throughout the Figures.

In this embodiment, a single type of cluster 302 is used, i.e. all clusters 302 have the same design.

Figure 4:
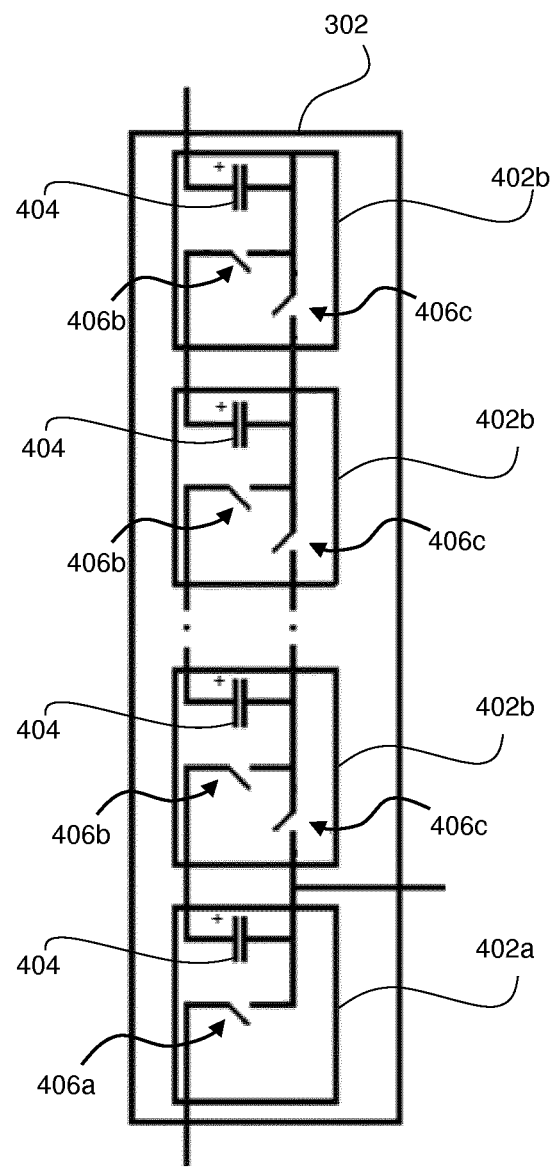
FIG. 4 shows the detail of a cluster of a DC-DC converter as shown in FIG. 3.

A cluster 302 of the converter 300 is shown in FIG. 4. In this example, the cluster 302 comprises a number of functional cells 402, each comprising at least one cell capacitor 404 and at least one cell switch 406a, 406b, 406c. It will be noted that there are two cell types: A first cell type, referred to herein as a connecting cell 402a, comprises a single switch 406a and a single capacitor 404. A second cell type, referred to herein as a series connected cell 402b, comprises two switches, referred to herein as a series connection switch 406b, and an intermediate switch 406c, and a single capacitor 404.

Again, while the cell switches 406 are represented as simple switches, in some examples at least one cell switch 406 may be provided by a switch unit comprising a uni-directional switch associated with a uni-directional current device, such as a diode, such that the switch may be by-passed in its open state when the current flow is in a first direction but current will not flow in the opposite direction unless the cell switch 406 is closed. Alternatively several switches could be provided in a series and/or parallel connection and arranged to operate together to provide the function of a single switch. As explained in greater detail below, such a series connection may be more desirable for the connecting cell switch 406a.

As mentioned above, the parallel connection switches 304c are arranged such that the connection between the clusters 302 may be a series connection or a parallel connection. Within each cluster 302, if the series connection switch 406b is closed and the intermediate switch 406c is open, the capacitors 404 therein are connected in series.

This is illustrated schematically in FIGS. 5A and 5B, which respectively show the clusters 302 connected in series and in parallel, such that the converter 300 is in a first and second commutation state respectively. The connections between the cells inside a cluster 302 are in a series connection in both configurations. In FIG. 5B, a matrix configuration of capacitors 404 comprising a plurality of branches 502, each made up of a single cluster 302, connected in parallel across the lower voltage network, is seen.

During reconfiguration between the first and second commutation states, and even if the converter 300 is isolated from both the higher and lower voltage networks, there may still be relatively high voltage levels across certain circuit components. For reasons expanded upon below, relating to the ratings and power losses of the switching components, it is generally preferred to operate switches at low, or zero voltage and/or current conditions during a commutation event. To utilise or achieve a low voltage condition, one or a number of intermediate commutation states may be provided as described below. Further, it is possible to take advantage of the resonant nature of the circuit (which, as would be appreciated by the skilled person, and as mentioned above, is an LC circuit) to operate the switches at, or close to, the 'zero crossing point', and therefore achieve low or zero current conditions.

An example of the commutation states of a converter 300a is shown in FIG. 6A-F. In this example, a simple converter 300a comprising two clusters 302, each containing three cells 402 (labelled in relation to the upper cluster 302 of FIG. 6A only), is shown.

In FIG. 6A, a first commutation state is shown. The clusters 302 are connected in series to the higher voltage network. To that end, the higher voltage switch 304a is closed and the lower voltage network switch 304b is open. The parallel connection switches 304c are also open. Within the cells 402, the connecting cell switch 406a in the connecting cell 402a is closed, and the clusters 302 are therefore arranged in series. The series connecting switches 406b in the series connected cells 402b are also closed and the intermediate switch 406c of the series connected cells 402b is open: therefore, the capacitors 404 within each cluster 302 are also connected in series.

As can be seen from the bold black line, this forms a connection between the positive and negative higher voltage dc terminals 306a, 306b where all of the capacitors 404 in all of the cells 402 are arranged in series.

Figures 6D, 6E:
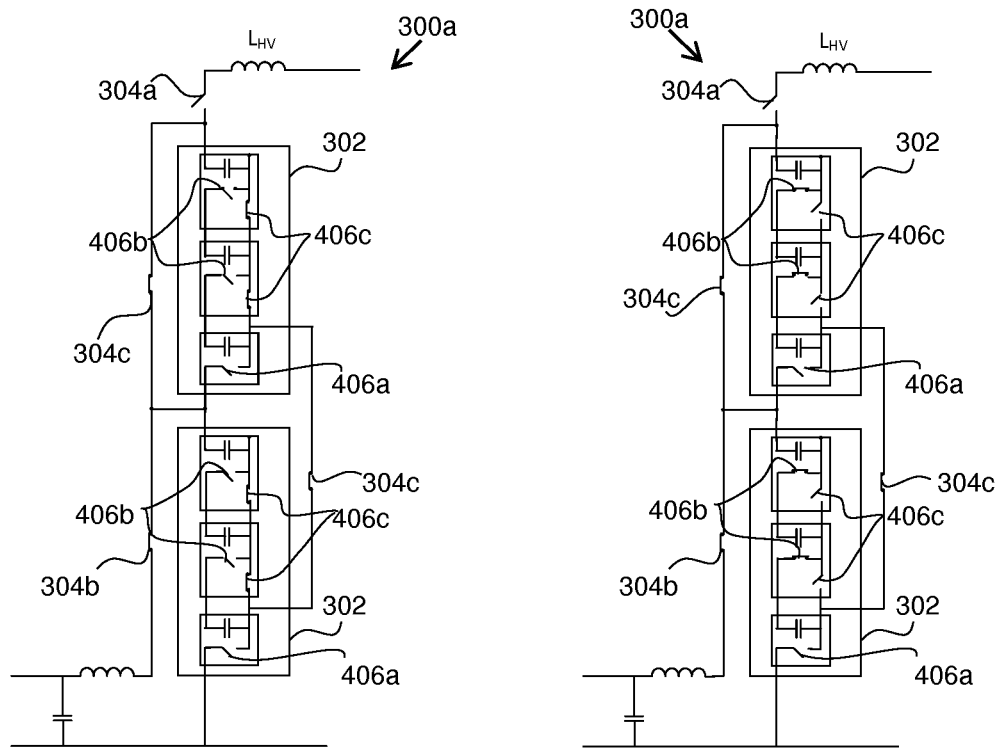
Figure 6F:
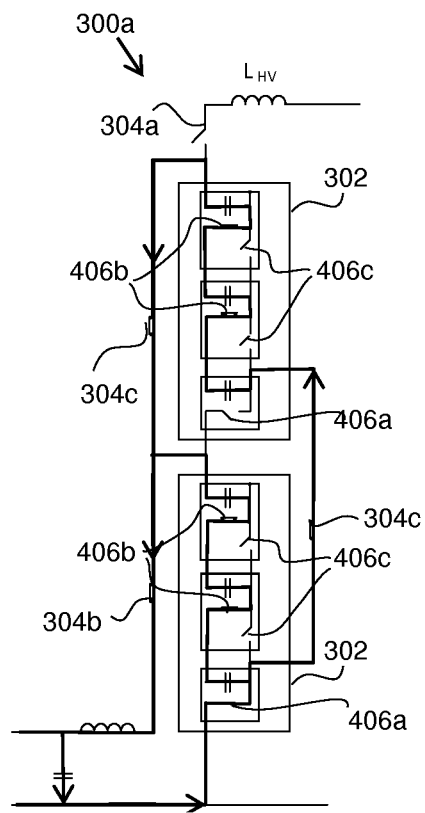

The second commutation state, in which the converter is connected to the lower voltage dc network, is shown in FIG. 6F. However, various intermediate commutation states are now described with reference to FIG. 6B to 6E A first intermediate commutation state is shown in FIG. 6B. It will be noted that both network switches 304a and 304b are now open, so the converter 300a is not connected to either network. In addition, the connecting cell switches 406a in the connecting cells 402a are open. Otherwise, the commutation states of the switches 304, 406 remain unchanged from those shown in FIG. 6A. In this state, the series connection between the clusters 302 has been interrupted by the opening of the connecting cell switch 406a, but the series connection of the capacitors 404 within each cluster 302 remains. As will be appreciated, once the connection with both networks has been broken, the voltage across the connecting cell switch 406a should be zero or low, as the capacitors 404 should be balanced. Therefore, opening the connecting cell switches 406a during this period allows for a zero, or low, voltage commutation of these switches 406a. As this low/zero voltage state may not be seen in subsequent switching states, it is desirable to operate these switches at this point in the cycle (although, as will be appreciated, not essential if the switches 406a are rated sufficiently highly).

A second intermediate commutation state is shown in FIG. 6C. Both network switches 304a and 304b remain open, as do connecting cell switches 406a in the connecting cells 402a. However, the switching positions within the series connected cells 402b are reversed: the series connecting switches 406b are open and the intermediate switches 406c of the series connected cells 402b are closed. Therefore, the series connection of the capacitors 404 within each cluster 302 has been interrupted in order to reduce the voltage across the parallel connecting switches 304c. Indeed, in this commutation state, no two capacitors 404 are connected in series. The capacitors 404 act to clamp the voltage within each cell so that, at most, the voltage across a switch 406b, 406c in this operation is the voltage across one of the capacitors 404.

In FIG. 6D, the lower voltage network switch 304b is closed, as are the parallel connection switches 304c. Such switching has taken place at relatively low voltage—at most the combined voltage of the capacitors in a module—thanks to the configuration assumed in FIG. 6C. However, the connection across the lower voltage network is not complete as the connecting cell switches 406a in the connecting cells 402a remain open. As in FIG. 6C, the series connecting switches 406b are open and the intermediate switches 406c of the series connected cells 402b are closed. As in FIG. 6C, no two capacitors 404 are connected in series.

In FIG. 6E, the switching positions within the series connected cells 402b is again reversed such that the series connecting switches 406b are closed and the intermediate switches 406c of the series connected cells 402b are open (the capacitors 404 again acting to clamp the voltage in each cell to the voltage across a cell capacitor 404). The series connection of capacitors 404 within each cluster 302 has therefore been restored. The connecting cell switches 406a in both connecting cells 402a remain open, however, so the clusters 302 remain isolated from one another (and are also disconnected from the lower voltage terminals).

Finally, in FIG. 6F, the connecting cell switch 406a in the connecting cell 402a directly connected to the negative terminal 308b of the lower voltage dc network is closed, completing the connection to the lower voltage network. It will be noted that the connecting cell switch 406a in the connecting cell 402a of the other cluster remains open to ensure the clusters 302 are connected in parallel. If more clusters were provided, this switch 406a would be open in all such clusters, with only the connecting cell switch 406a in the connecting cell 402a directly connected to the negative terminal 308b being closed. With the parallel connection switches 304c closed and conducting current, the clusters 302 are arranged in parallel, as can be seen from the bold black line in FIG. 6F, and are thus connected to provide a 2×3 matrix of capacitors 404 (as in this example there are two clusters 302 with three cells 402 each) across the lower voltage dc network.

A similar sequence of commutation states would be employed for the inverse process, this is, to go from the parallel connection of clusters 302 to series connection of clusters 302.

It will be noted that, while the series connecting switches 406b and the intermediate switches 406c of the series connected cells 402b have to be rated to withstand a voltage magnitude equal the voltage across one cell capacitor. However, the lower voltage network switch 304b and the parallel connection switches 304c and connecting cell switches 406a in the connecting cells 402a must be rated to withstand a voltage magnitude equal the voltage of all the capacitors 404 connected in series inside a cluster 302, which is also the lower voltage output of the circuit ($V_{dc\_low}$). The higher voltage switch 304a in this example may experience a higher voltage, specifically the Voltage of the higher voltage network ($V_{hvdc}$) less the voltage of a cluster ($V_{cluster}$), i.e. $V_{hvdc}-V_{cluster}$, and should be selected or configured accordingly.

For circuit configurations where a switch may be expected to operate at a voltage (e.g. the lower voltage side output of the circuit for many of the switches 304b, 304c, 406, or $V_{hvdc}-V_{cluster}$ for the higher voltage switch 304a) which exceeds the voltage rating of readily available (or readily affordable) semiconductor switches (typically around 6.5 kV for IGBTs at the time of writing), a series of switches may be used to provide any, some or all of the external switches 304 and the connecting cell switches 406a (although in principle the series connecting switches 406b and the intermediate switches 406c could each also comprise a series connection of switches). While, as noted above, switching at low or zero current and voltage conditions is generally desirable as it reduces the risk of damage to switching components, in the particular examples where each switch is actually provided by a series connection of lower-rated voltage switches, it is also desirable as it avoids the need to balance the voltage across these switches such that no one switch has to exceed its voltage rating.

It can therefore be seen that any such dynamic voltage sharing problems during the commutation of the series connecting switches 304, 406a are avoided by operating the converter 300 with intermediate switching states in such a way that the intermediate switches 406c are closed to ensure a zero or low voltage switching of any such series connected connecting switches 304, 406a.

By closing the intermediate switches 406c and opening the series connecting switches as in FIGS. 6C and 6D, the series connection between the capacitors 404 is removed, achieving a zero or low voltage commutation for series connected switches. The capacitors 404 in such an arrangement act to clamp the voltage across the switches within the clusters 302.

It will be noted that such a converter 300 is readily scalable as more clusters 302 can be added to increase the higher voltage output and, assuming that the capacitors 404 are provided such that, arranged in series within a cluster 302, they are rated to match the lower voltage peak, adding further cells 402 to a cluster 302 allows for a higher lower voltage. In any event, as no one cluster capacitor 404 appears alone (i.e. rather than in series with at least one other capacitor) in a parallel connection, no one capacitor 404 has to be rated to the full lower voltage. This means that higher voltages may be used on the lower voltage side, and/or, as high rated capacitors are rare and relatively expensive, a greater range of capacitors, likely at reduced cost, may be used.

Furthermore, the series connected semiconductors switches do not need to withstand high voltage levels during the conversion process, as the capacitors 404 act to clamp the voltage across the switches 406 inside each of the clusters 302, thus avoiding any dynamic voltage sharing problems which might otherwise arise during commutation associated with series connected semiconductor devices.

A second embodiment of a converter, specifically a bi-pole converter 700 is shown in FIG. 7. In this example, the converter 700 has a bi-pole configuration, specifically arranged as a 'symmetric monopole' where both the positive and negative poles are at a voltage level $$\frac{Vdc}{2}$$

with respect to ground. The bi-pole converter 700 comprises two arms 702, 704, and the lower voltage terminal is connected to a midpoint between the arms 702, 704. In this embodiment, the lower voltage output is at ground potential, which allows for a more relaxed voltage isolation ratings for any equipment connected to it, as may be desirable, for example, for a relatively small VSC station feeding a local AC grid.

The converter arms each comprise a number of clusters 302, one of which from each arm is shown in enlarged view within FIG. 7. In the lower arm, the cluster 302' of the bottom arm 704 which connects directly to the lower voltage terminal has a connecting cell 402a' having a different arrangement to that described previously, and specifically having the arrangement shown in FIG. 8, in order to allow a connection to both the positive and negative lower voltage terminal. The connecting cell shown in FIG. 8 has two terminal connections, a positive terminal connection 802, and a negative terminal connection 804, each associated with a switch unit 806. This allows selective connection of this lower arm 704 to both the positive and negative lower voltage terminal.

A similar commutation regime to that described above could be used with such a converter 700.

FIGS. 9A-E shows some waveforms anticipated during the operation of the modular cascaded DC-DC converter in the monopole configuration. In this particular example, a 2 MW converter with a HV (High Voltage)/LV (Low Voltage) conversion ratio of 2:1 (6 kV/3 kV) is implemented. The converter in this case has two cells 402 per cluster 302) and two clusters 302, therefore the converter has four capacitors and the capacitor voltage is limited to 1.5 kV.

Figure 9A:
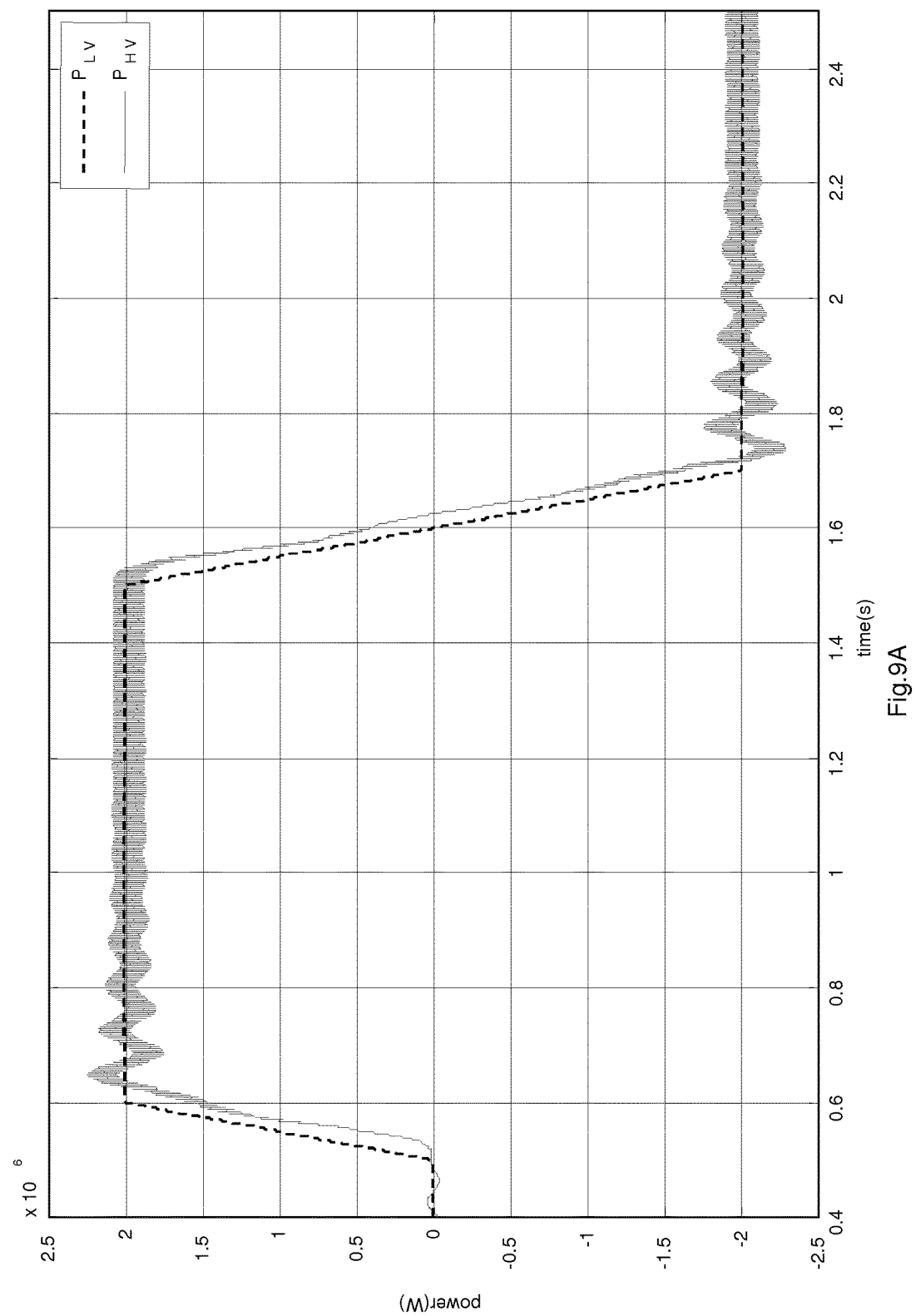

In FIG. 9A, the average active power flow in both the higher voltage and lower voltage terminals of the converter is shown, and correctly track the ±2 MW power demand. Power reversal occurs without significant disruption to the wave form (although it does take a short amount of time for the power to assume the steady state).

FIG. 9B shows the voltage waveforms and FIG. 9C the current waveforms at the lower voltage terminal. It will be noted that the voltage is properly regulated to the desired value of 3 kV, and the current is smoothly reversed when the power flow direction is changed.

Figure 9D:
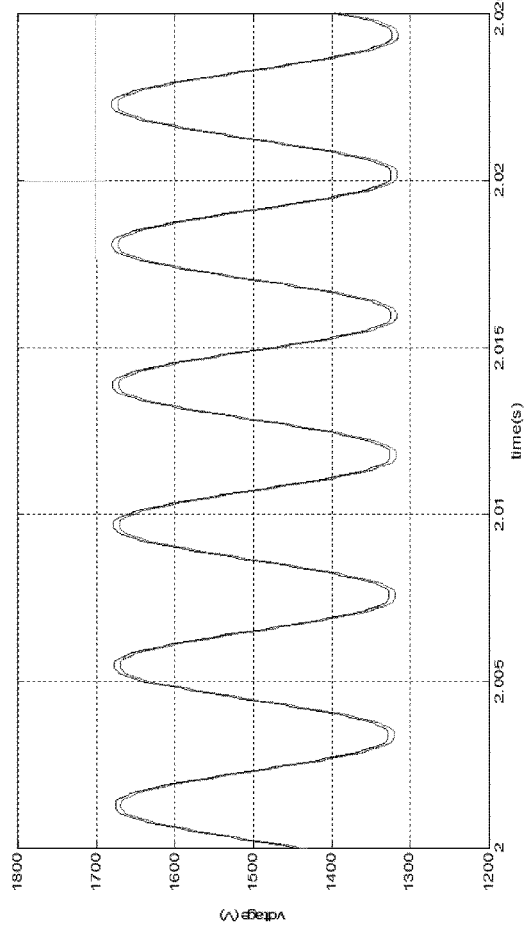
Figure 9E:
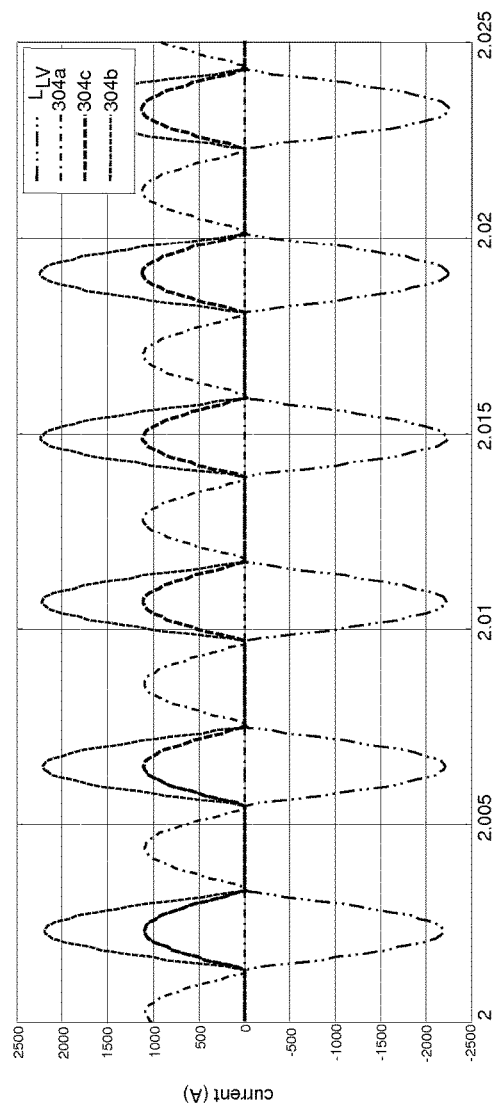

FIG. 9D shows the capacitor voltages, which are kept within desired voltage ripple margins around the 1500V average voltage value and are well balanced, and FIG. 9E shows the currents through the lower voltage inductor and the four external solid state switches in the circuit (i.e. the higher voltage switch 304a, the lower voltage network switch 304b and the parallel connection switches 304c). In particular, the FIG. 9E shows the current through the higher voltage network switch 304a build and then fall while the capacitors 404 connected thereto charge. When a zero current condition is achieved, the converter 300 switches to the second commutation state, in which current flows through the lower voltage network switch 304b, and through each (or in this case both) of the parallel connection switches 304c until current flow is again zero (as will be appreciated by the skilled person, throughout this process, the charge which was gained during the connection to the higher voltage side is transferred to the lower voltage side and the current rises and falls back to zero thanks to the action of the resonant circuit), at which point the first commutation state is resumed. A zero net energy exchange in the capacitors 404 between the two commutation states is seen. The current waveforms of FIG. 9E show the resonant nature of the converter 300 operation and the zero current commutation of the converter switches.

FIGS. 10A-E shows simulation results for a ±6 MW bi-pole converter having a similar configuration to that in FIG. 7 with a HV (High Voltage)/LV (Low Voltage) conversion ratio of 6:1 (72 kV/12 kV). The converter in this case has three cells 402 per cluster 302 and three clusters 302 per arm, therefore the converter 700 has nine capacitors 404 per arm. Since each cluster 302 is composed of three cells 402, the voltage in each individual capacitor 404 is limited to 4 kV.

Figure 10A:
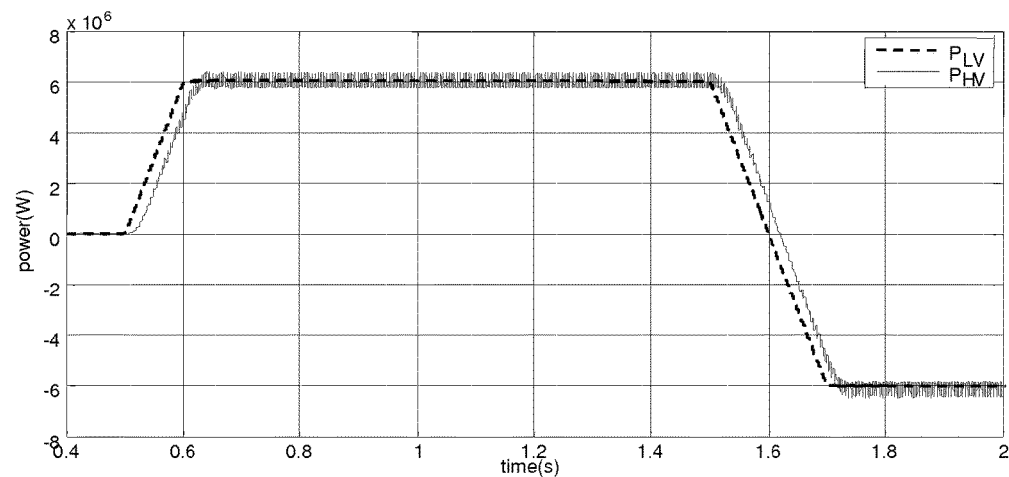

In FIG. 10A the average active power flow in both the higher voltage and lower voltage terminals of the converter is plotted, and correctly track the ±6 MW power demand.

Figure 10B:
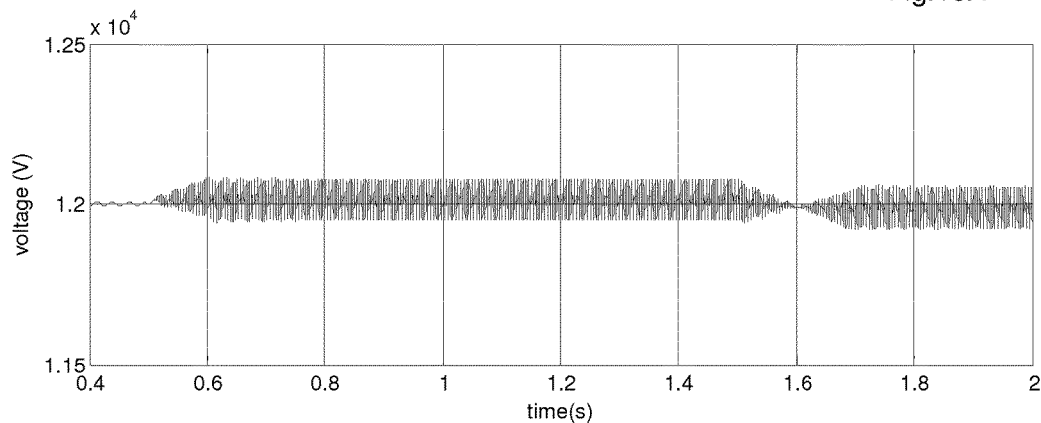
Figure 10C:
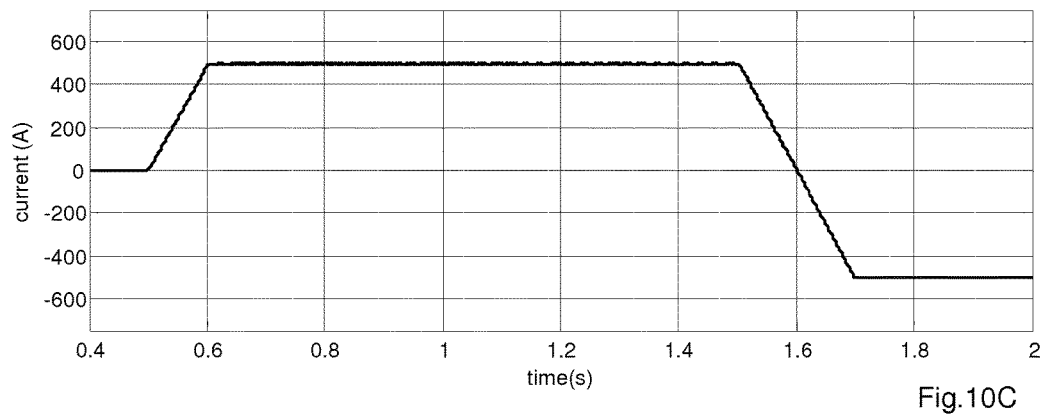

FIG. 10B shows the voltage waveforms and FIG. 10O the current waveforms at the lower voltage terminal.

FIGS. 10D and E show respectively, the capacitor voltages of the top and bottom arms, which are kept within desired voltage ripple margins around the 4 kV average voltage value and are well balanced. Since both arms of the bipolar circuit are operated alternately, it can be observed that the discharge of the capacitors 404 happens simultaneously for both top and bottom arms (i.e. when all the capacitors 404 are in series across the higher voltage side), but the charge from the lower voltage side takes place alternative, first for the cells 402 in the top arm and then for the cells 402 in the bottom arm when each of them is connected in parallel with the lower voltage output. In this case the capacitor voltage and switch currents are displayed for the operation interval when the power flow direction is from the lower voltage side to the higher-voltage side.

Figure 10F:
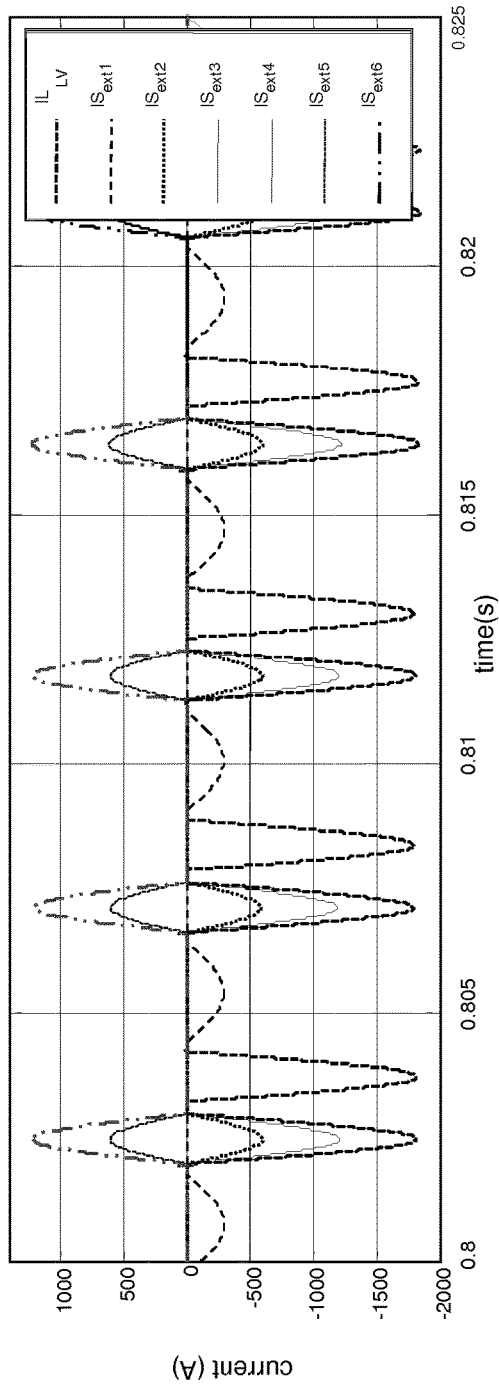
Figure 10G:
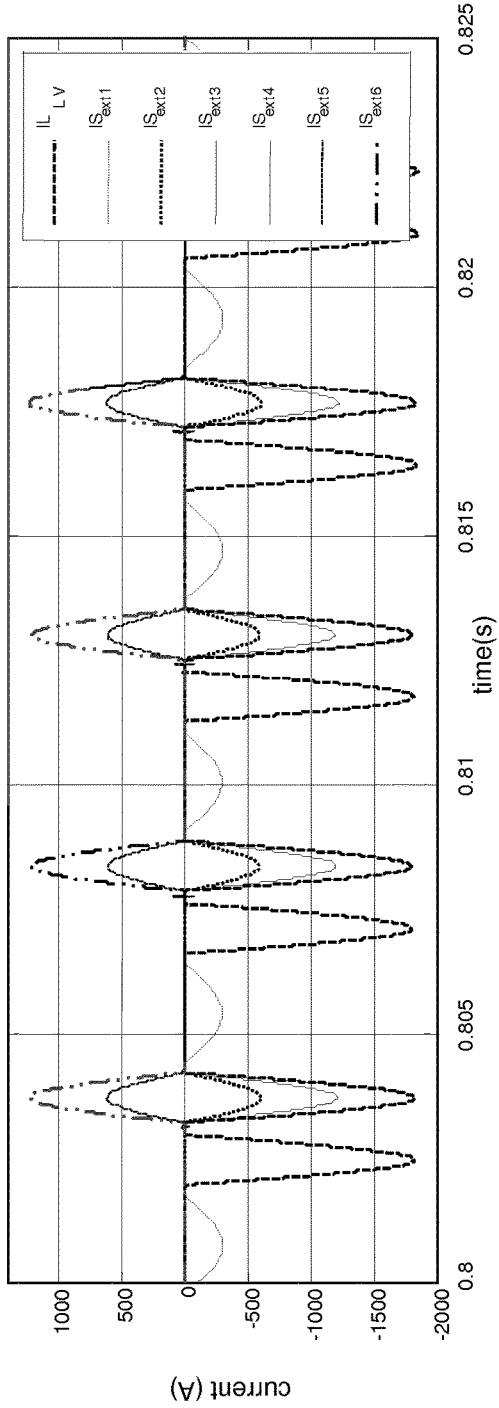

FIG. 10F shows the currents through the lower voltage inductor and the six external solid state switches in the circuit (i.e. the higher voltage switch 304a ($IS_{ext1}$), the lower voltage network switch 304b ($IS_{ext6}$) and the parallel connection switches 304c ($IS_{ext2-5}$), are well balanced.

While certain examples have been described herein, the invention is not limited to those described and alternatives will occur to the skilled person. In particular, while converters with particular numbers of cells and modules have been described, more of few modules/cells may be provided, and could differ in design from those shown. Where numerical examples are provided herein these are purely for the purpose of example. Where a capacitor, diode, inductor and/or switch is described herein, the skilled person will be aware that more than one capacitor/switch/diode/inductor can be used to provide the function described and the terms should be understood accordingly.

The invention claimed is:

1. A DC to DC converter for converting voltage between a higher voltage and a lower voltage, the converter comprising:
   a plurality of capacitors and switch units and being controllable between a first and a second commutation state by operation of at least one switch unit, wherein:
   in the first commutation state, the converter is configured for connection to higher voltage terminals and the capacitors are connected in series; and
   in the second commutation state, the converter is configured for connection to lower voltage terminals, and the capacitors are connected to form at least two branches connected in parallel, each of the at least two branches comprising a series connection of at least two capacitors.

2. The converter of claim 1 wherein the capacitors are arranged in at least two clusters, wherein:
   in the first and second commutation state, the capacitors within a cluster are connected in series; and
   the clusters are connected in series in the first commutation state and in parallel in the second commutation state.

3. The converter of claim 2, wherein each of the at least two such clusters comprise substantially the same configuration of components.

4. The converter of claim 2, comprising at least two switch units which are controllable to allow selective connection of the clusters in series in the first commutation state and in parallel in the second commutation state.

5. The converter of claim 1, wherein each capacitor is associated with at least one switch unit in a cell, and at least two such cells comprise substantially the same configuration of components.

6. The converter of claim 1, wherein:
   the converter is controllable by operation of at least one switch unit to one or more intermediate commutation state(s); and
   the converter is arranged to assume at least one intermediate commutation state between assuming the first and the second commutation states.

7. The converter of claim 6, wherein the converter is controllable into an intermediate commutation state in which at least one series connection between capacitors, which are in series in the first commutation state and in the second commutation state, is interrupted.

8. The converter of claim 6 wherein at least one intermediate commutation state comprises a state in which at least one series connection between capacitors, which in the second commutation state are within a common branch of the converter, is interrupted.

9. The converter of claim 8, wherein at least one switch unit is provided between each capacitor in a branch to selectively connect or interrupt the series connection in the branch in an intermediate commutation state.

10. The converter of claim 6, wherein the converter is controllable:
from the first commutation state into a first intermediate commutation state in which the series connection between the branches is interrupted; and from the first intermediate commutation state into a second intermediate commutation state in which the series connection between the branches and between the capacitors within a branch is interrupted.

11. The converter of claim 6, wherein the converter is controllable from the second commutation state into an intermediate commutation state, in which the series connection between the capacitors within a branch is interrupted.

12. The converter of claim 6, wherein:
capacitors, which in the second commutation state are within a common branch, are in series across a plurality of series connecting switch units; and
the intermediate commutation state(s) are arranged such that maximum voltage across any series connecting switch unit during transformation between the first and second commutation states is at most the voltage across a single capacitor.

13. The converter of claim 1, wherein:
the converter has a bi-pole configuration, wherein the converter comprises two arms, each arm comprising a plurality of capacitors and switch units; and
the converter is controllable between first and second commutation states by operation of at least one switch unit, wherein:
in the first commutation state, the converter is configured for connection to higher voltage terminals and the capacitors are connected in series; and
in the second commutation state, the converter is configured for connection to lower voltage terminals, and
wherein the capacitors in each arm are connected to form at least two parallel branches, the branches comprising a series connection of at least two capacitors, wherein the lower voltage terminal is connected to a point between the arms.

14. The converter of claim 13, wherein one or more switch units is provided in at least one arm to allow selective connection of at least one arm to both the positive and negative lower voltage terminal.

15. The converter of claim 1, wherein the switch units comprise one or more of:
a single switch;
a series of connected switches;
a parallel connection of switches;
at least one uni-directional switch associated with an anti-parallel unidirectional current device;
a series connection of uni-directional switches wherein the series connection is associated with at least one anti-parallel uni-directional current device; and
a semiconductor device.

16. The converter of claim 1, wherein the converter is bi-directional.

17. The converter of claim 1, comprising at least one inductor arranged to form a resonant circuit such that, in use of the converter, a condition of substantially zero current flow is seen across the connected voltage terminals; and wherein the converter is arranged to disconnect the terminals when a substantially zero current flow condition is achieved.

18. A method of converting voltage between a higher voltage and a lower voltage, the method comprising:
(i) providing a plurality of capacitors in a series configuration connected to higher voltage terminals;
(ii) disconnecting the capacitors from the higher voltage terminals;
(iii) reconfiguring the connections therebetween into a matrix configuration comprising at least two parallel branches, each of the at least two parallel branches comprising a series connection of at least two capacitors; and
(iv) connecting the matrix configuration to lower voltage terminals.

19. The method of converting voltage of claim 18, wherein:
the capacitors form a resonant circuit with at least one inductor; and
step (i) is-carried out until current flow within the circuit at least substantially ceases.

20. The method of converting voltage of claim 18, comprising reconfiguring the connections between the capacitors into at least one intermediate configuration between steps (i) and (iv), the reconfiguring comprising reconfiguring the connections between the capacitors which are series connected in both the matrix and the series connection to remove at least one series connection therebetween.

21. The method of converting voltage of claim 18, wherein reconfiguring the connections into a matrix configuration comprises:
(a) interrupting the series connection between the branches;
(b) interrupting the series connection of capacitors within the branches;
(c) connecting the branches in parallel; and
(d) restoring the series connection of capacitors within the branches.

22. The method of converting voltage of claim 18, comprising the steps of:
(v) disconnecting the capacitors from the lower voltage terminals;
(vi) reconfiguring the connections therebetween into a series configuration; and
(vii) connecting the series configuration to the higher voltage terminals.

23. The method of converting voltage of claim 22, comprising reconfiguring the connections between the capacitors into at least one intermediate configuration between steps (v) and (vii), the reconfiguring comprising reconfiguring the connections between the capacitors which are series connected in both the matrix and the series connection to remove at least one series connection therebetween.

24. The method of converting voltage of claim 22, wherein reconfiguring the connections into a series configuration comprises:
(a) interrupting the series connection of capacitors within the branches;
(b) reconfiguring the converter to remove the parallel connection between branches;
(c) restoring the series connection of capacitors within the branches; and
(d) connecting the branches in series.

25. The method of converting voltage of claim 22, wherein the capacitors form a resonant circuit with at least one inductor and step (v) is carried out when the current flow across the lower voltage terminals at least substantially ceases.

\* \* \* \* \*